United States Patent [19]
Medved et al.

[11] Patent Number: 5,818,619
[45] Date of Patent: Oct. 6, 1998

[54] WIRELESS COMMUNICATION SYSTEM

[75] Inventors: David Medved; Hillel Bar Lev; Leonid Davidovich, all of Jerusalem, Israel

[73] Assignee: Jolt Ltd., Jerusalem, Israel

[21] Appl. No.: 661,306

[22] Filed: Jun. 13, 1996

[30] Foreign Application Priority Data

Jun. 15, 1995 [IL] Israel .......................................... 114176

[51] Int. Cl.$^6$ .................................................. H04B 10/00
[52] U.S. Cl. ...................... 359/172; 359/118; 359/152; 340/825.72; 370/277
[58] Field of Search ............................ 359/118–119, 143, 359/113, 152, 172, 174, 176; 455/151–2; 379/56; 340/825.72; 370/277–278

[56] References Cited

U.S. PATENT DOCUMENTS

| 5,247,380 | 9/1993 | Lee et al. ................................ 359/143 |
| 5,343,319 | 8/1994 | Moore ..................................... 359/152 |
| 5,535,031 | 7/1996 | Cecchini ................................. 359/113 |

FOREIGN PATENT DOCUMENTS

| 0599522 | 6/1994 | European Pat. Off. ............... 359/152 |
| 2 268 653 | 1/0000 | United Kingdom . |
| WO 83/04462 | 12/1983 | WIPO . |
| 29 90/09709 | 8/1990 | WIPO . |
| WO 91/20139 | 12/1991 | WIPO . |

*Primary Examiner*—Kinfe-Michael Negash
*Attorney, Agent, or Firm*—Scully, Scott Murphy & Presser

[57] ABSTRACT

The invention provides a wireless communication system having an airlink transceiver including an airlink transmitter and an airlink receiver for respectively transmitting and receiving signals over the air; an optical communication network interface unit for transmitting optical signals to the airlink transmitter and for receiving optical signals from the airlink receiver; and a universal converter unit, coupled to the airlink transceiver and to the optical communication network interface unit, for supplying optical signals without protocol conversion to the optical communication network interface unit, and electrical signals to the airlink transceiver. The invention also provides a method for connecting a wireless communication system to a plurality of communication networks, each having a different fundamental type of basic networking technologies.

12 Claims, 5 Drawing Sheets

WIRELESS COMMUNICATION SYSTEM

FIELD OF THE INVENTION

The present invention relates to wireless communication systems in general, and more particularly to optical wireless communication systems.

BACKGROUND OF THE INVENTION

Wireless communication systems typically employ radio-frequency (RF) or optical airlinks. When optical airlinks are employed, each end unit includes an optical transmitter and an optical receiver, sometimes referred to in combination as transceivers. Optical transceivers usually operate in the infrared spectrum.

Wireless communication systems are generally part of a local area network (LAN), wide area network (WAN), metropolitan area network (MAN), personal area network (PAN), or PABX/PBX telephone networks. Typically, various kinds of communication networks operate at various data rates and employ different fundamental types of basic networking technologies and protocols, such as Token-Ring, Ethernet, FDDI and ATM. Therefore, in cases where wireless communications are used, a separate wireless interface has to be coupled to each communication network, to enable the transfer of data.

Such limitations require that any time a user switches from one communication network to another, a wireless transceiver unit must be physically replaced. During a change in system configuration or a system upgrade, a user may be required to switch over a number of separate networks. Thus, the replacement of wireless transceiver units may often be necessary, burdening the users of wireless communication networks.

SUMMARY OF THE INVENTION

The present invention seeks to provide wireless communication systems which are independent of the protocol employed in a communication network, and which are therefore applicable to any type of network, e.g., Ethernet, Token-Ring, FDDI, ATM, fast Ethernet, and telephone networks employing PABX/PBX systems.

According to the invention, the above objectives are achieved by providing a wireless communication system comprising an airlink transceiver including an airlink transmitter and an airlink receiver for respectively transmitting and receiving signals; an optical communication network interface unit for transmitting optical signals to the airlink transmitter and for receiving optical signals from the airlink receiver, and a universal converter unit coupled to the airlink transceiver and to the optical communication network interface unit, for supplying optical signals without protocol conversion to the optical communication network interface unit, and for supplying electrical signals to the airlink transceiver.

In addition, the system includes an optical switch unit coupled to the universal converter unit and to a plurality of optical communication network interface units, for switching between different types of communication networks.

Preferably, the system includes a communication network coupled to the optical communication network interface unit, wherein the communication network is at least one of an Ethernet network, a Token-Ring network, an FDDI network, an ATM network, a fast Ethernet network, or a telephone network employing PABX/PBX systems.

In accordance with a preferred embodiment of the present invention, the universal converter unit in the system includes an optical transmitter unit operable to receive first electrical signals generated by signals received from the airlink receiver, and to transmit optical signals at a first wavelength via fiber optic cables to a receiver in the optical communication network interface unit, the optical signals transmitted at a first wavelength being detectable by the receiver in the optical communication network interface unit, and an optical receiver unit operable to receive optical signals from a transmitter in the communication network at at least one of said first wavelength and a second wavelength, to convert the optical signals received from the transmitter in the communication network to second electrical signals and to provide the second electrical signals to the airlink transmitter, wherein the optical communication network interface unit is operable to receive and transmit optical signals at at least one of the first wavelength and the second wavelength.

Preferably, the first electrical signals and the second electrical signals are in at least one of ECL and TTL formats.

Yet preferably, the airlink transceiver is one of an optical airlink transceiver, an RF airlink transceiver, and an ultrasound airlink transceiver.

The invention also provides, in a preferred embodiment, a universal converter unit for supplying optical signals without protocol conversion to at least one of an airlink transceiver and an optical communication network, the universal converter including an optical transmitter unit operable to receive first electrical signals generated by signals received from an airlink receiver in the airlink transceiver, and to transmit optical signals via fiber optic cables at a first wavelength to a receiver in the optical communication network, the optical signals transmitted at a first wavelength being detectable by the optical receiver in the communication network; and an optical receiver unit operable to receive optical signals from a transmitter in the communication network at at least one of the first wavelength and a second wavelength, to convert the optical signals received from the transmitter in the communication network to second electrical signals and to provide the second electrical signals to an airlink transmitter in the airlink transceiver, wherein the optical communication network is operable to receive and transmit optical signals at at least one of the first wavelength and the second wavelength.

In accordance with another preferred embodiment of the present invention, there is provided a method of connecting a wireless communication system to a plurality of communication networks, each having a different fundamental type of basic networking technologies, the method including employing an airlink transceiver including an airlink transmitter and an airlink receiver for respectively transmitting and receiving signals; providing an optical communication network interface unit for transmitting optical signals to the airlink transmitter and for receiving optical signals from the airlink receiver; and coupling a universal converter unit to the airlink transceiver and to the optical communication network interface unit, for supplying optical signals without protocol conversion to the optical communication network interface unit, and for supplying electrical signals to the airlink transceiver.

In addition, the method includes coupling an optical switch unit to the universal converter unit and to a plurality of optical communication network interface units for switching between different types of communication networks.

Preferably, the method includes coupling the optical communication network interface unit to at least one of a plurality of communication networks, wherein the communication networks include any combination of an Ethernet network, a Token-Ring network, an FDDI network, an ATM network, a fast Ethernet network, and a telephone network employing PABX/PBX systems.

In accordance with another preferred embodiment of the present invention, coupling of a universal converter unit includes connecting, to a receiver in the optical communication network interface unit and to the airlink receiver, an optical transmitter unit operable to receive first electrical signals generated by signals received from the airlink receiver, and to transmit optical signals at a first wavelength via fiber optic cables to the receiver in the optical communication network interface unit, the optical signals transmitted at a first wavelength being detectable by the receiver in the optical communication network interface unit; connecting, to a transmitter in the optical communication network interface unit and to the airlink transmitter, an optical receiver unit which is operable to receive optical signals from the transmitter in the optical communication network interface unit, at at least one of the first wavelength and a second wavelength, to convert the optical signals received from the transmitter in the optical communication network interface unit to second electrical signals and to provide the second electrical signals to the airlink transmitter; and enabling the optical communication network interface unit to receive and transmit optical signals at at least one of the first wavelength and the second wavelength.

A further preferred embodiment of the invention provides a method of supplying optical signals without protocol conversion to at least one of an airlink transceiver and an optical communication network, the method including coupling, to a receiver in the optical communication network and to an airlink receiver in the airlink transceiver, an optical transmitter unit which is operable to receive first electrical signals generated by signals received from the airlink receiver and to transmit optical signals at a first wavelength via fiber optic cables to the receiver in the optical communication network, the optical signals transmitted at a first wavelength being detectable by the receiver in the optical communication network; connecting, to a transmitter in the optical communication network and to an airlink transmitter in the airlink transceiver, an optical receiver unit which is operable to receive optical signals from the transmitter in the optical communication network, at at least one of the first wavelength and a second wavelength, to convert the optical signals received from the transmitter in the optical communication network to second electrical signals, and to provide the second electrical signals to the airlink transmitter; and enabling the optical communication network to receive and transmit the optical signals at at least one of the first wavelength and the second wavelength.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
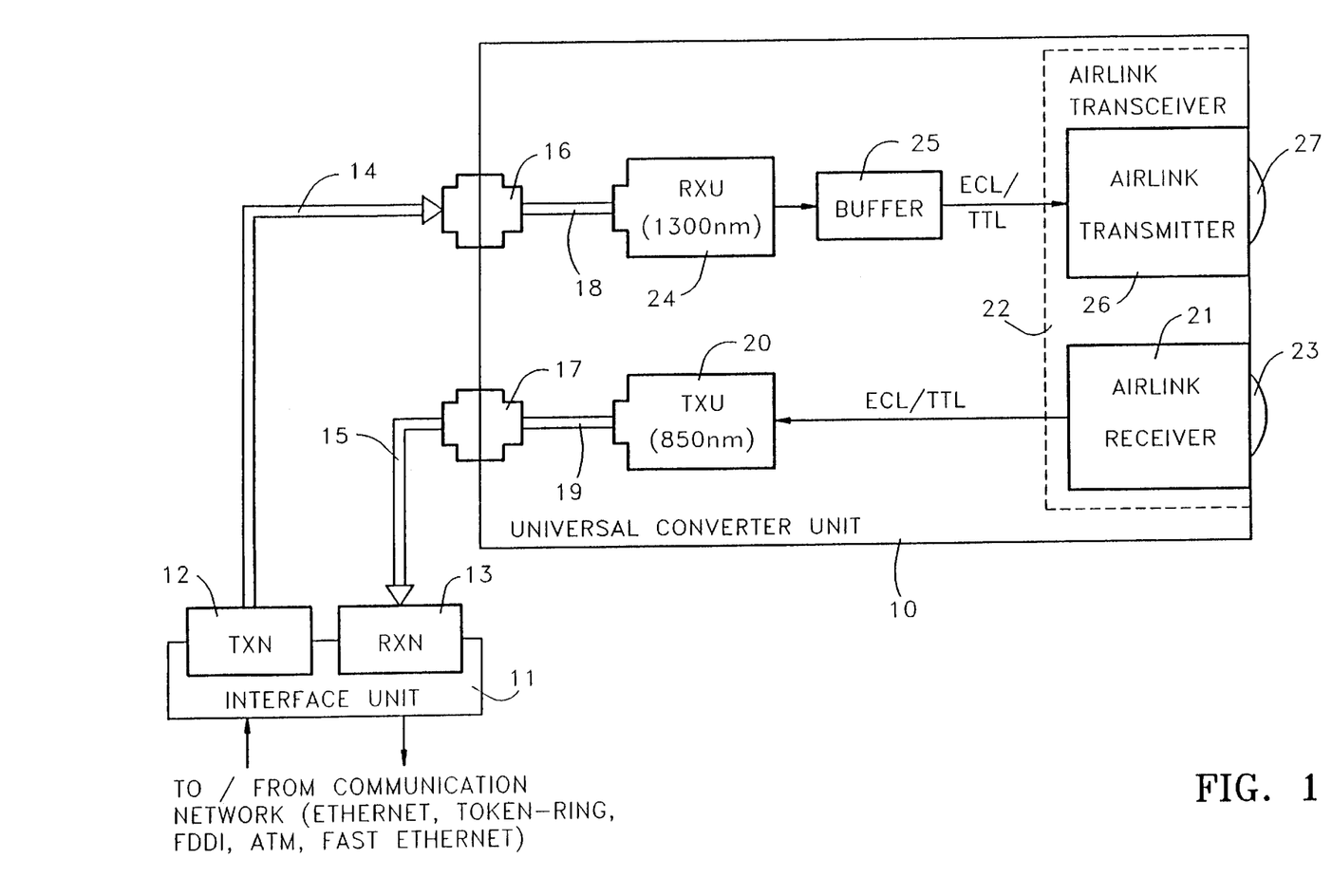
FIG. 1 is a generalized block diagram of a universal converter unit which forms part of an optical wireless communication system constructed and operative in accordance with a preferred embodiment of the present invention.

Reference is now made to FIG. 1, which is a generalized block diagram illustration of a universal converter unit which forms part of an optical wireless communication system constructed and operative in accordance with a preferred embodiment of the present invention.

A universal converter unit 10 is coupled to a communication network, which may be any communication network such as Ethernet, Token-Ring, FDDI, ATM, fast Ethernet or telephone network employing PABX/PBX systems, at E1/T1 and/or higher data rates. Typically, the communication network transmits and receives data via an interface unit 11, which includes a fiber optic transmitter 12 and a fiber optic receiver 13, also referred to herein respectively as TXN and RXN.

In optical communication networks, optical data is communicated over the air and/or over fiber optic cables. The optical data communicated over fiber optic cables is typically transmitted at two wavelength ranges: 800–900 nanometers and about 1300 nanometers. In Ethernet and Token-Ring networks, optical data is typically communicated using the 800–900 nanometers range, whereas in ATM and FDDI networks which enable high transfer rates, optical data is communicated at 1300 nanometers. Thus, transmitter 12 and receiver 13 in interface unit 11 of FIG. 1 may operate at either of these two wavelength ranges, in accordance with the employed application.

In order to enable universality of the universal converter unit 10, i.e., connectivity to any type of communication network, the universal converter unit 10 must be able to transfer optical data to and from communication networks at both ranges of 800–900 and 1300 nanometers. Typically, receivers operating at 800–900 nanometers are silicon photodiode receivers, and those operating at 1300 nanometers are indium-gallium-arsenide (InGaAs) photodiode receivers.

Figure 2:
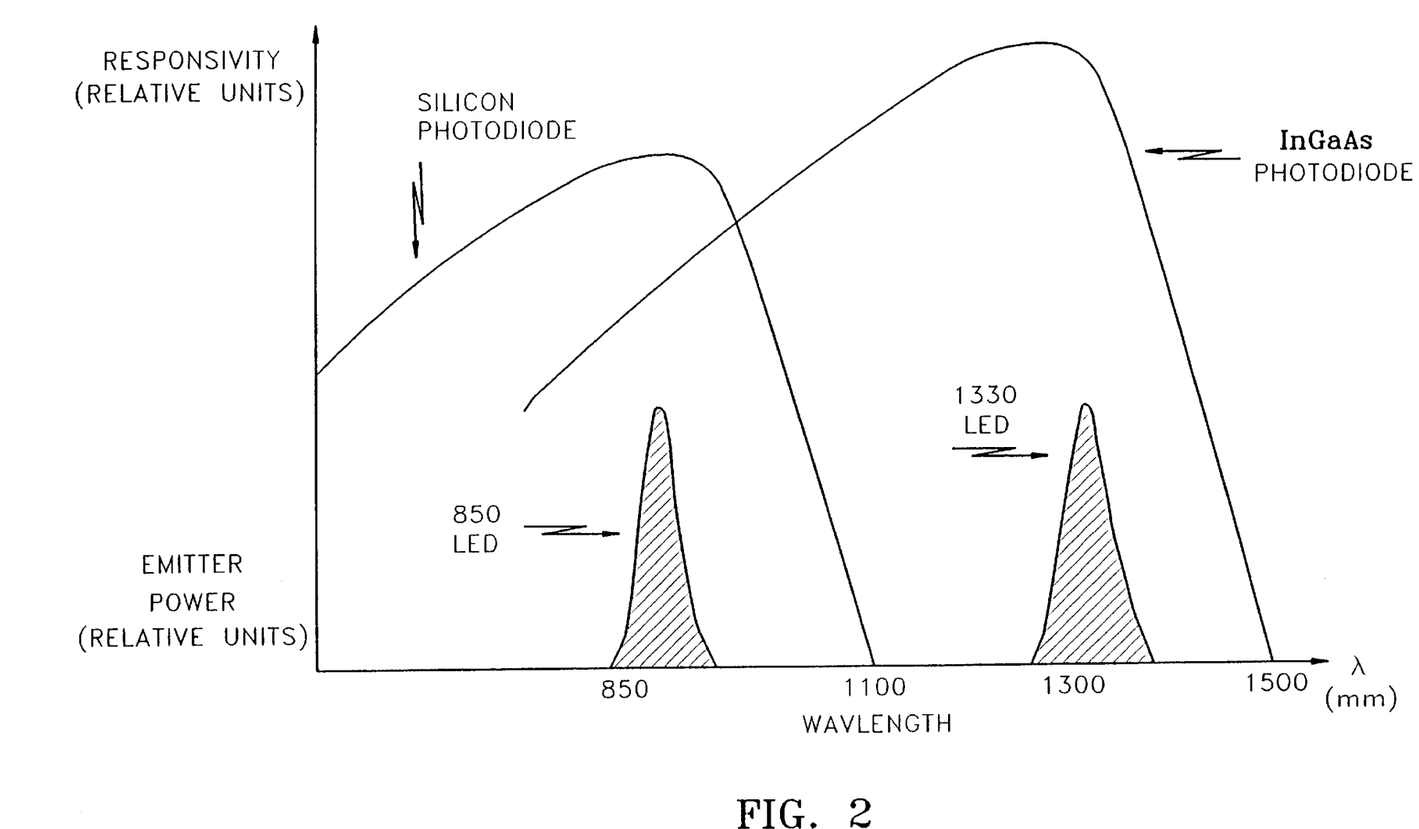
FIG. 2 is an illustration of plots of spectral responsivity of silicon photodiodes and InGaAs photodiodes, and emitting power of LEDs operating at 850 nanometers and at 1300 nanometers.

Plots including spectral responsivity of silicon photodiodes and InGaAs photodiodes, and emitting power of LEDs operating at 850 nanometers and those operating at 1300 nanometers, are illustrated in FIG. 2. From the illustrations of FIG. 2, it is apparent that InGaAs photodiodes are sensitive to radiation emitted by an LED operating at a wavelength in the range 800–900 nanometers, as well as to that at 1300 nanometers. However, this is not the case for silicon photodiodes. As is seen in FIG. 2, silicon photodiodes are responsive to radiation emitted by an LED operating at a wavelength in the range of 800–900 nanometers, but are not responsive to that at 1300 nanometers.

Referring now back to FIG. 1, transmitter TXN 12 and receiver RXN 13 are coupled to universal converter unit 10 via fiber optic cables 14 and 15 respectively. Fiber optic cables 14 and 15 are coupled to cable-to-cable connectors 16 and 17 respectively, which are mounted on a panel (not shown) which may form part of universal converter unit 10. Inside the converter unit 10, cable-to-cable connectors 16 and 17 are coupled to fiber optic cables 18 and 19 respectively. Fiber optic cable 19 is coupled to a fiber optic transmitter 20, also referred to as TXU. Preferably, transmitter TXU 20 operates at a selected wavelength in the wavelength range 800–900 nanometers, e.g., at 850 nanometers. The transmitter TXU 20 receives data from an airlink receiver 21, which forms part of an airlink transceiver 22, in an emitter-coupled logic (ECL) or transistor-transistor logic (TTL) format. Typically, airlink receiver 21 receives over-the-air infrared radiation via a lens system 23.

Transmitter TXU 20 is operable to transmit the data received by airlink receiver 21 to receiver RXN 13, which may typically be a silicon or an InGaAs photodiode. Since transmitter TXU 20 operates at 850 nanometers, the data transmitted by transmitter TXU 20 is sensed and received by receiver RXN 13, regardless of the type of photodiode employed in receiver RXN 13. Thus, transmitter TXU 20 is compatible with almost any type of optical communication network.

Fiber optic cable 18 is coupled to a receiver 24, also referred to as RXU, which provides data received over fiber optic cable 18 to a buffer 25. Buffer 25 is operable to provide the data in an ECL or TTL format to an airlink transmitter 26, which forms part of airlink transceiver 22. Transmitter 26 transmits the data over the air via a lens system 27.

It is thus seen that universal converter unit 10 is operative to provide and receive optical data to a communication network, and to provide and receive electrical signals to airlink transceiver 22. Thus, it is to be appreciated that airlink transceiver 22 need not be an optical transceiver, but rather it may be any type of airlink transceiver which has an electrical interface, such as an RF or an ultrasound transceiver. In that case, universal converter unit 10 may provide connectivity to a network via a conventional optical interface of the network.

If transceiver 22 is an RF transceiver, airlink receiver 21 may be an RF receiver, airlink transmitter 26 may be an RF transmitter, and lens systems 23 and 27 are replaced by antennas. If transceiver 22 is an ultrasound transceiver, airlink receiver 21 may be an ultrasound sensor, airlink transmitter 26 may be an ultrasound generator, and lens systems 23 and 27 are obviated. Preferably, receiver RXU 24 is an InGaAs photodiode and is operable to receive data transmitted by transmitter TXCN 12, which may typically be an LED operating at 850 or at 1300 nanometers. As explained above with reference to FIG. 2, receiver RXU 24 may sense and receive data transmitted by transmitter TXN 12, regardless of the type of LED employed in Transmitter TXN 12. Thus, receiver RXU 24 is also compatible with almost any type of optical communication network.

It is to be appreciated that the receiver and the transmitter may include other combinations of LEDs operating at a first wavelength and photodiodes sensitive both to said first wavelength and to a second wavelength, to provide compatibility with many types of optical communication networks. Such combinations may include, for example, an LED operating at 850 nanometers and a germanium (Ge) photodiode responsive at wavelengths in the range 800–1600 nanometers.

The data passing via the universal converter unit 10 is raw data which is not subject to any communication protocol. Thus, universal converter unit 10 may operate with any fundamental type of basic networking technology, such as Token-Ring, Ethernet, FDDI, ATM, fast Ethernet, or a telephone network employing PABX/PBX systems without modification, and an appropriate protocol conversion is applied to the raw data only in a selected network.

The universal converter unit 10 of FIG. 1 provides simple connectivity to a communication network. In the case where a user is connected to an Ethernet network and switches to a Token-Ring network, the user is only required to replace the fiber optic cables coupling the Ethernet interface unit to universal converter unit 10 with a set of fiber optic cables coupling a Token-Ring interface unit thereto, or to operate a switch in the optical switch unit, to enable transfer to the selected network.

Figure 3:
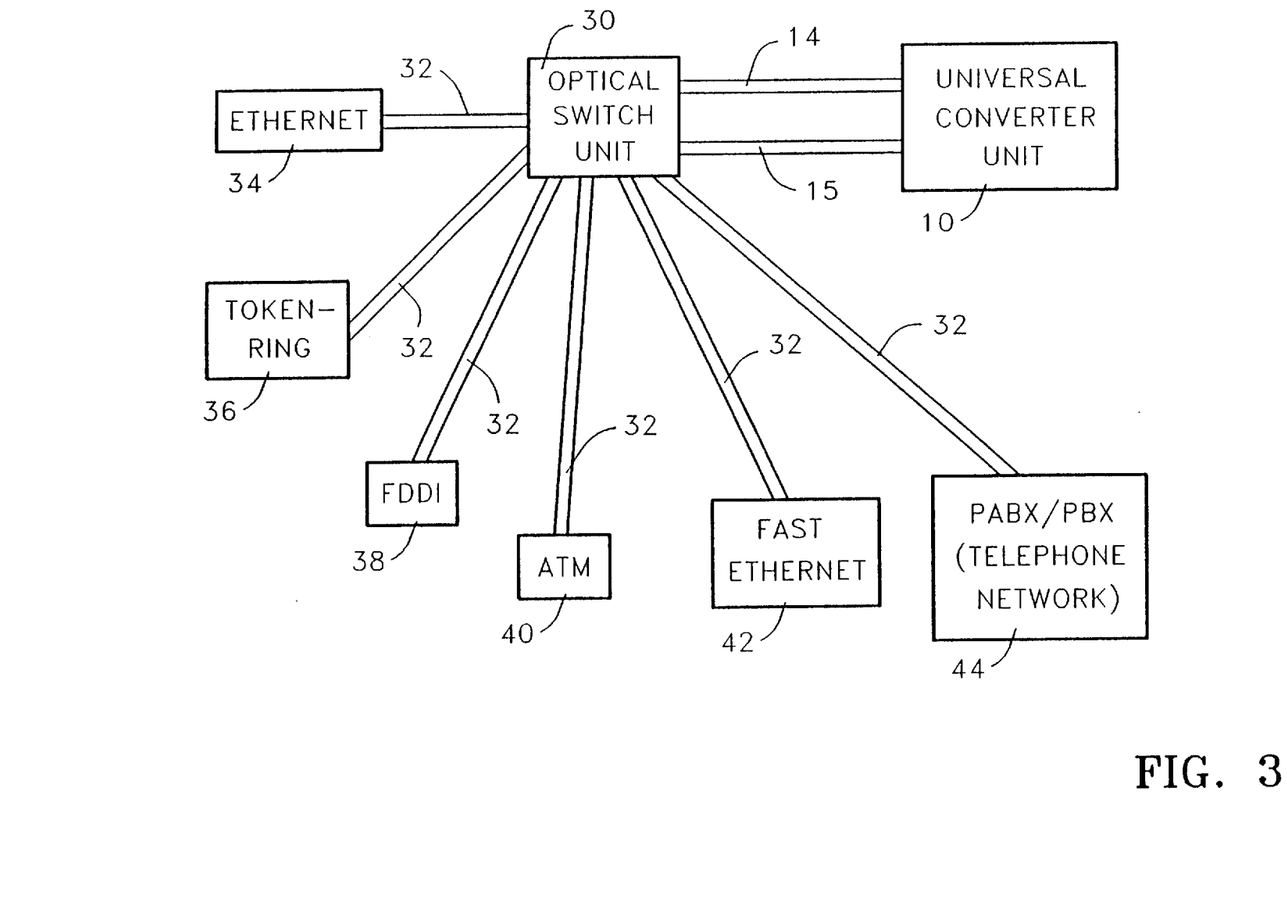
FIG. 3 is a generalized block diagram illustration of a network configuration including the universal converter unit of FIG. 1 and a switching unit coupled to a plurality of communication networks constructed and operative in accordance with a preferred embodiment of the present invention.

Reference is now made to FIG. 3, which is a block diagram illustration of a network configuration including the universal converter unit of FIG. 1 and a switching unit coupled to a plurality of communication networks.

In a preferred embodiment of the present invention, fiber optic cables 14 and 15 of FIG. 1 may be coupled to a conventional optical switch unit 30, such as OSW-114 and OSW-122 optical switches from Wandel & Goltermann, U.S.A. Optical switch unit 30 is coupled, via a plurality of optic cables 32, to separate communication networks 34, 36, 38, 40, 42, and 44. Communication networks 34, 36, 38, 40, 42 and 44 may be an Ethernet, Token-Ring, FDDI, ATM, fast Ethernet, and telephone network employing PABX/PBX systems, respectively. It is to be appreciated that optical switch unit 30 is employed to switch between the plurality of fiber optic cables for selectively connecting to each of these separate communication networks.

Figure 4:
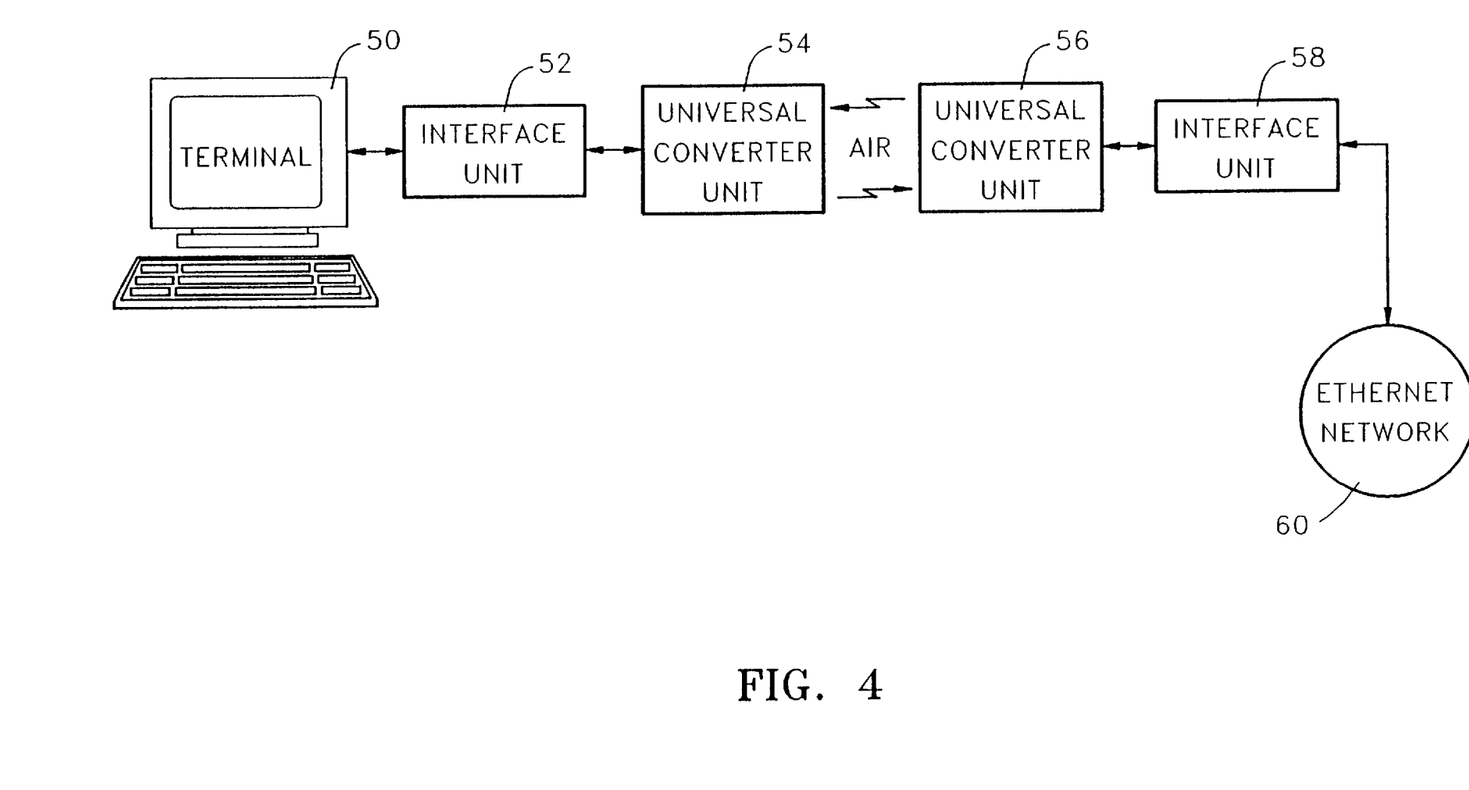
FIG. 4 is a generalized block diagram illustration of an Ethernet network including the universal converter unit of FIG. 1, constructed and operative in accordance with a preferred embodiment of the present invention.

FIG. 4 is a block diagram illustration of an Ethernet network including the universal converter unit of FIG. 1, constructed and operative in accordance with a preferred embodiment of the present invention. Shown in FIG. 4 is computer terminal 50, coupled to a conventional interface unit 52 which is operable to convert an Ethernet Protocol to a stream of digital data which is to be transmitted over the air. Interface unit 52 is coupled to a universal converter unit 54 such as universal converter unit 10 of FIG. 1, which is operable to receive the stream of digital data from interface unit 52 and to transmit it over the air to a remote universal converter unit 56.

Remote universal converter unit 56 is operable to receive the stream of digital data from universal converter unit 54 and to provide it to a conventional interface unit 58, which is operable to convert the stream of digital data received from universal converter unit 56 back to an Ethernet protocol. Then the converted data may be communicated, via coax or hard wires, to Ethernet network 60. Preferably, Ethernet network 60 may provide data to computer terminal 50 over the same communication link. Thus, Ethernet protocol data transmitted by Ethernet network 60 is converted at interface unit 58 to a stream of digital data and is provided to universal converter unit 56.

Universal converter unit 56 transmits the stream of digital data over the air to universal converter unit 54, which provides the stream of digital data to interface unit 52. Interface unit 2 converts the stream of digital data back to an Ethernet protocol, and provides the data to computer terminal 50.

It is to be appreciated that universal converter units 54 and 56 do not apply any communication protocol to the data, and that the data is transmitted and received by universal converter units 54 and 56 as a stream of raw optical data.

Figure 5:
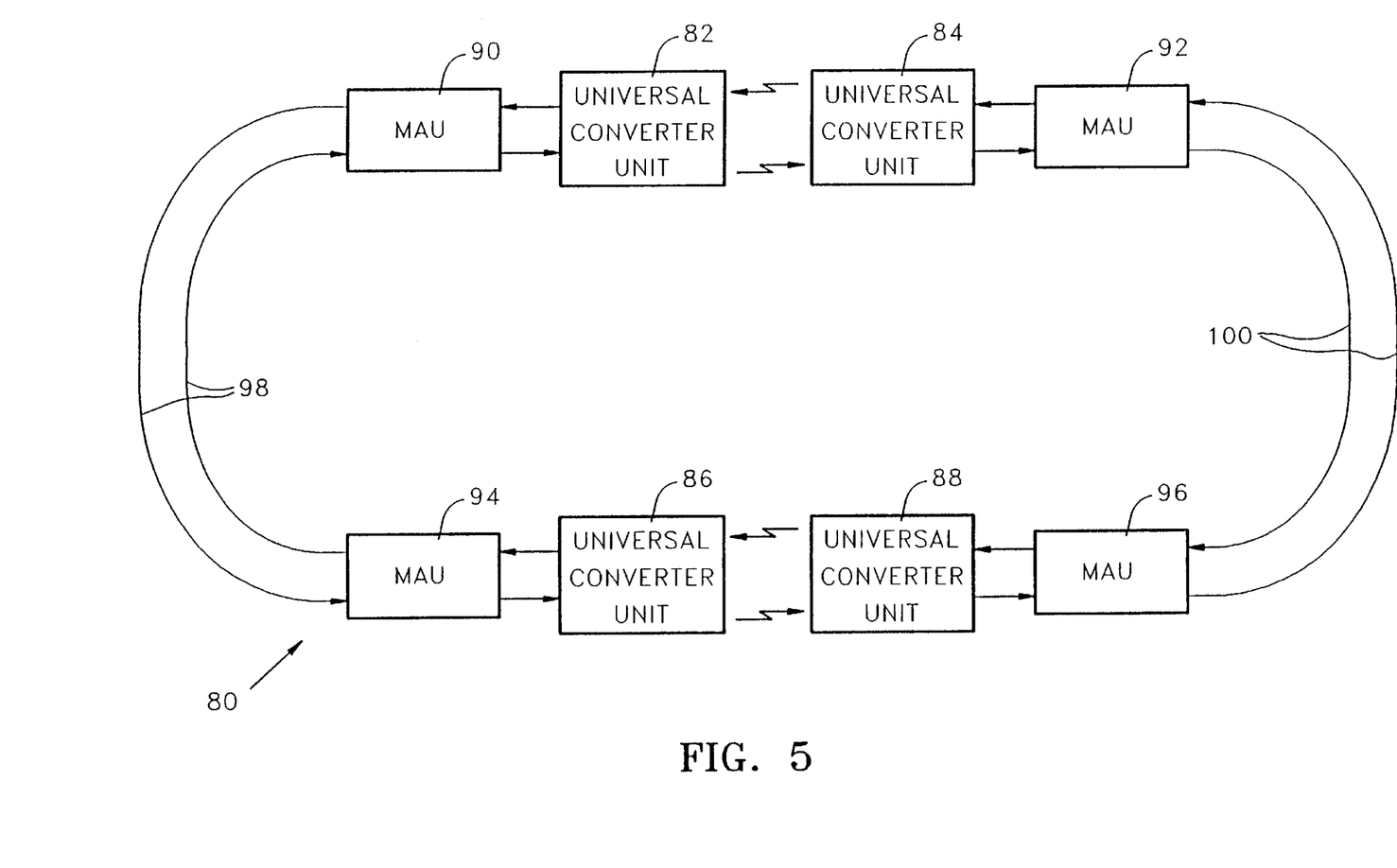
FIG. 5 is a generalized block diagram illustration of a Token-Ring network including the universal converter unit of FIG. 1, constructed and operative in accordance with a preferred embodiment of the present invention.

Reference is now made to FIG. 5, which is a block diagram illustration of a Token-Ring network including the universal converter unit of FIG. 1, constructed and operative in accordance with a preferred embodiment of the present invention.

The Token-Ring network of FIG. 5, generally indicated by reference numeral 80, typically includes four universal converter units 82, 84, 86 and 88, such as the universal converter unit of FIG. 1. Units 82, 84, 86, 88 are coupled via fiber optic cables to media access units (MAUs) 90, 92, 94 and 96, respectively, and are operative to enable full duplex communication. MAUs 90, 92, 94 and 96 apply a Token-Ring protocol to raw data received and transmitted by universal converter units 82, 84, 86 and 88, respectively.

Due to the Token-Ring configuration, a wraparound path 98 couples MAUs 90 and 94, and a second wraparound path 100 couples MAUs 92 and 96. Wraparound path 98 enables full duplex communication between MAUs 90 and 94, and wraparound path 100 enables full duplex communication between MAUs 92 and 96. As in the system of FIG. 4, universal converter units 82, 84, 86 and 88 do not apply any communication protocol to the data, and the data is transmitted and received by the universal converter units 82, 84, 86 and 88 as a stream of raw optical data.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A wireless communication system, comprising:

an airlink transceiver (22) including an airlink transmitter (26) and an airlink receiver (21) for respectively transmitting and receiving signals over the air;

an optical communication network interface unit (11) for transmitting optical signals via a first optical connector (14) to said airlink transmitter and for receiving optical signals via a second optical connector (15) from said airlink receiver; and a universal converter unit (10), electrically coupled to said airlink transceiver and optically coupled to said first and second optical connectors of the optical communication network interface unit, for respectively supplying and receiving electrical and optical signals without protocol conversion between said optical communication network interface unit and said airlink transceiver.

2. The system according to claim 1, further comprising an optical switch unit coupled to said universal converter unit and to a plurality of optical communication network interface units, for selectively switching between communication networks.

3. The system according to claim 2, wherein said communication networks are selected from the group of networks including Ethernet, Token-Ring, FDDI, ATM, fast Ethernet, and a telephone network employing PABX/PBX systems.

4. The system according to claim 1, wherein said universal converter unit includes:

an optical transmitter unit, operable to receive first electric signals generated by signals received over the air from said airlink receiver, and to transmit, via fiber optic cables, optical signals at a first wavelength, to a receiver in said optical communication network interface unit, said optical signals transmitted at said first wavelength being detectable by said receiver in said optical communication network interface unit; and an optical receiver unit, operable to receive optical signals from a transmitter in said communication network at at least one of said first wavelength and a second wavelength, to convert said optical signals received from said transmitter in said communication network to second electric signals and to provide said second electric signals to said airlink transmitter, wherein said optical communication network interface unit is operable to receive and transmit optical signals at at least one of said first wavelength and said second wavelength.

5. The system according to claim 1, wherein said airlink transceiver is one of a group of transceivers including optical airlink, RF airlink, and ultrasound airlink transceivers.

6. A universal converter unit for supplying optical signals without protocol conversion to at least one of an airlink transceiver and an optical communication network, said universal converter unit comprising:

an optical transmitter unit, operable to receive first electric signals generated by signals received over the air from an airlink receiver in said airlink transceiver, and to transmit, via fiber optic cables, optical signals at a first wavelength, to a receiver in said optical communication network, said optical signals transmitted at said first wavelength being detectable by said optical receiver in said communication network; and an optical receiver unit, operable to receive optical signals from a transmitter in said communication network at at least one of said first wavelength and a second wavelength, to convert said optical signals received from said transmitter in said communication network to second electric signals and to provide said second electric signals to an airlink transmitter in said airlink transceiver, wherein said optical communication network is operable to receive and transmit optical signals at at least one of said first wavelength and said second wavelength.

7. A universal converter unit according to claim 6, wherein said airlink transceiver is one of a group of transceivers including optical airlink, RF airlink, and ultrasound airlink transceivers.

8. A method of connecting a wireless communication system to a plurality of different communication networks, said method comprising the steps of:

transmitting and receiving signals over the air through an airlink transceiver (22) including an airlink transmitter (26) and an airlink receiver (21), transmitting optical signals to the airlink transmitter via a first optical connector (14) and receiving optical signals from the airlink receiver via a second optical connector (15) through an optical communication network interface unit (11), supplying and receiving optical and electrical signals without protocol conversion between said optical communication network interface unit (11) and said airlink transceiver (22), by a universal converter unit (10) coupled to said airlink transceiver and to said optical communication network interface unit.

9. The method according to claim 8, further comprising switching between different types of communication networks with an optical switch unit coupled to said universal converter unit and to a plurality of said optical communication network interface units.

10. A method according to claim 8, further comprising coupling said optical communication network interface unit to at least one of a plurality of communication networks, including Ethernet, Token-Ring FDDI, ATM, fast Ethernet, and a telephone network employing PABX/PBX systems.

11. The method according to claim 8, wherein the steps of supplying and receiving further comprise:

receiving first electric signals generated by signals received over the air from said airlink receiver by an optical transmitter unit (20), and transmitting, via fiber optic cables, to a receiver (13) in said optical communication network interface unit, optical signals at a first wavelength, and detecting said optical signals transmitted at a first wavelength by said receiver (13) in said optical communication network interface unit;

receiving optical signals from a transmitter (12) in said optical communication network interface unit at least one of said first wavelength and a second wavelength by an optical receiver unit (24), and converting said optical signals received from said transmitter (12) in said optical communication network interface unit to second electric signals and providing said second electric signals to said airlink transmitter; and receiving and transmitting optical signals at at least one of said first wavelength and said second wavelength by said optical communication network interface unit.

12. A method of supplying optical signals without protocol conversion to at least one of an airlink transceiver (22) and an optical communication network, said method comprising the steps of:

receiving first electric signals generated by signals received over the air from said airlink receiver by an optical transmitter unit (20), and transmitting, via fiber optic cables, to a receiver (13) in said optical communication network, optical signals at a first wavelength, and detecting said optical signals transmitted at a first wavelength by said receiver (13) in said optical communication network;

receiving optical signals from a transmitter (12) in said optical communication network at least one of said first wavelength and a second wavelength by an optical receiver unit (24), and converting said optical signals received from said transmitter (12) in said optical communication network to second electric signals and providing said second electric signals to said airlink transmitter; and receiving and transmitting optical signals at at least one of said first wavelength and said second wavelength by said optical communication network.

* * * * *